No. 764,919. PATENTED JULY 12, 1904.
J. B. CRUM.
FRUIT SORTER.
APPLICATION FILED FEB. 17, 1904.
NO MODEL. 2 SHEETS—SHEET 1.
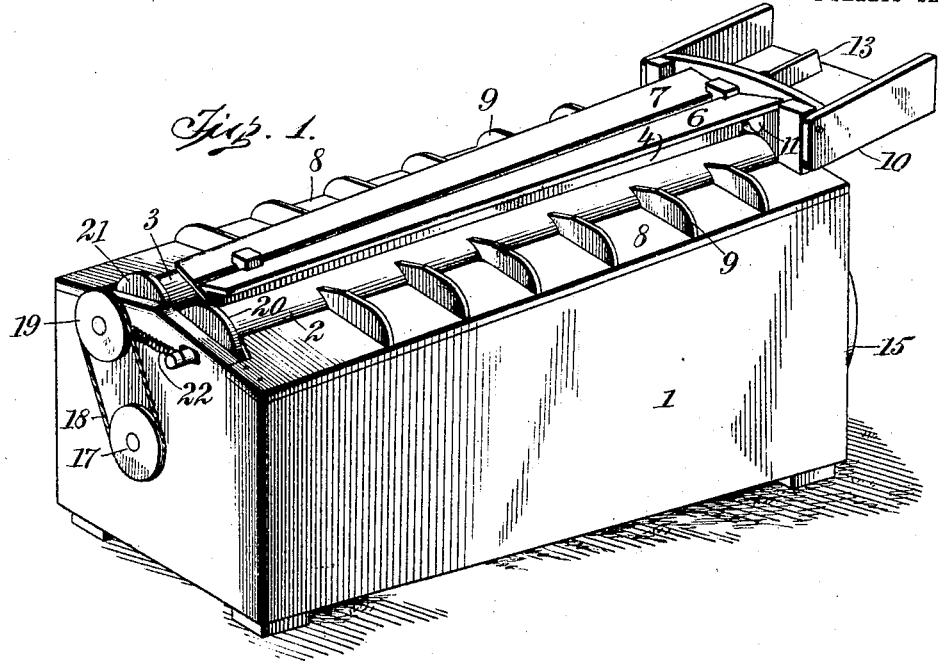
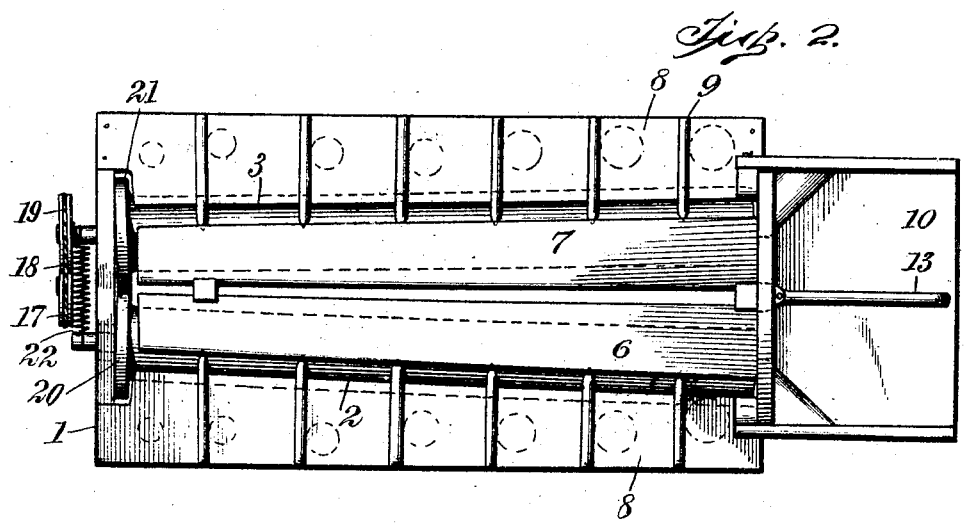
WITNESSES:
INVENTOR
James B. Crum
BY
ATTORNEYS No. 764,919. PATENTED JULY 12, 1904.
J. B. CRUM.
FRUIT SORTER.
APPLICATION FILED FEB. 17, 1904.
NO MODEL. 2 SHEETS—SHEET 2.

WITNESSES:

INVENTOR
James B. Crum
BY
ATTORNEYS

No. 764,919. Patented July 12, 1904.

UNITED STATES PATENT OFFICE.

JAMES B. CRUM, OF HOMELAND, FLORIDA.

FRUIT-SORTER.

SPECIFICATION forming part of Letters Patent No. 764,919, dated July 12, 1904.

Application filed February 17, 1904. Serial No. 193,935. (No model.)

*To all whom it may concern:*

Be it known that I, JAMES B. CRUM, a citizen of the United States, and a resident of Homeland, in the county of Polk and State of Florida, have invented a new and Improved Fruit-Sorter, of which the following is a full, clear, and exact description.

This invention relates to improvements in machines for sorting oranges, apples, and similar fruit, an object being to provide a machine for this purpose of simple construction, inexpensive, and by means of which the fruit may be rapidly sorted and the various sizes discharged in different piles or receptacles.

I will describe a fruit-sorter embodying my invention and then point out the novel features in the appended claims.

Reference is to be had to the accompanying drawings, forming a part of this specification, in which similar characters of reference indicate corresponding parts in all the figures.

Figure 3:
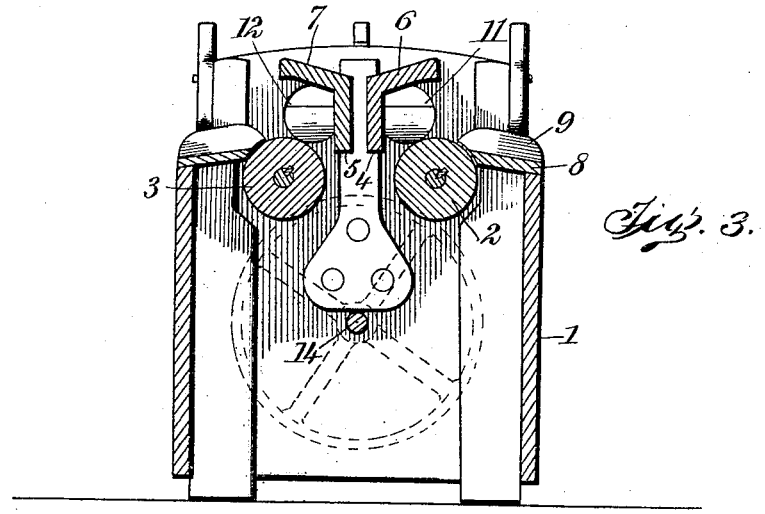
Figure 4:
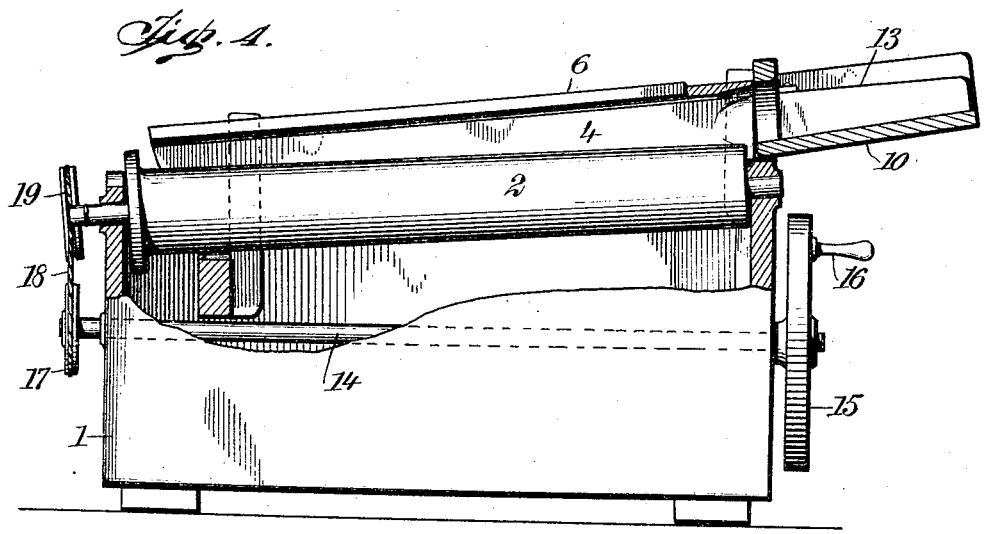
Figure 5:
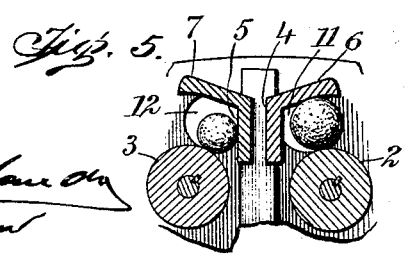

Figure 1 is a perspective view of a fruit-sorter embodying my invention. Fig. 2 is a plan view thereof. Fig. 3 is a transverse section. Fig. 4 is a side elevation, partly in section; and Fig. 5 is a sectional detail at the feed end of the machine.

Referring to the drawings, 1 designates a box or casing. Extended lengthwise in the casing is a pair of rollers 2 3, which have their journal-bearings in the end walls of the casing. These rollers are convergent from the feed end of the machine to the opposite end and they are also arranged at a slight downward incline. Arranged between the rollers are guide-boards 4 5 and extended outward from the guide-boards 4 5, are deflecting-flanges 6 7. These flanges project over the rollers, and the distance between the flanges and rollers gradually diminishes from the inlet end to the opposite end of the machine. At the outer sides of the rollers the casing is provided with laterally-inclined discharge-boards 8, which by means of partitions 9 are divided each into a series of discharge-troughs for the fruit.

At the feed end of the casing is a tray 10, the inner end wall of which is provided with openings 11 12, through which the fruit passes from the tray to the rollers, and mounted to swing transversely in the tray is a stop-bar 13, which may be arranged at the center, so that the fruit may be fed through both openings 11 12, or it may be swung to one side or the other, so that all the fruit will pass to one roller and finally be discharged at one side of the machine.

Extended through the casing and having bearings in the end walls thereof is a shaft 14, on which at the feed end of the machine is a balance-wheel 15, provided with a crank-handle 16, and on the opposite end of the shaft 14 is a pulley 17, from which a band 18 passes to engagement with a pulley 19 on the extended journal of the roller 3. The rollers at the lower end are provided with engaging friction-disks 20 21, so that the roller 2 will be operated from the roller 3. The disks 20 21 are held yieldingly together by means of a coiled spring 22, connected with the outer extended ends of the journals, as clearly shown in the drawings. It will be understood that the bearings for the journals are sufficiently large to permit of the necessary play.

In the operation oranges or other fruits are fed through the openings 11 12, and the smallest fruit will roll entirely to the lower end of the rollers, while the largest-sized fruit will be stopped by the deflectors at the feed end, and the rollers will cause the discharge of the large fruit outward through the opposite chutes, and obviously, owing to the incline of the deflectors, the various sizes of fruit will be stopped from downward movement at various points along the rollers and discharged outward.

Having thus described my invention, I claim as new and desire to secure by Letters Patent—

1. A fruit-sorter comprising a pair of rollers, guide-boards arranged between the rollers, and deflectors extending over the rollers, the distance between the rollers and deflectors diminishing from the feed end to the opposite end of the machine.

2. A fruit-sorter comprising a pair of converging rollers inclined downward from the inlet end, guide-boards arranged between the rollers, and deflectors extended over the rollers, the distance between the rollers and deflectors diminishing from the inlet end to the opposite end of the machine.

3. A fruit-sorter comprising a casing, a pair of rollers arranged therein, means for operating the rollers together, guide-boards extended lengthwise between the rollers and deflectors extended lengthwise of and over the rollers, the distance between said deflectors and the rollers gradually diminishing from the inlet end to the opposite end of the machine.

4. A fruit-sorter comprising a casing, a pair of rollers arranged therein, a guide extended lengthwise between the rollers, deflectors arranged lengthwise of and over the rollers, discharge-spouts at the outer sides of the rollers, and a feed-tray having openings in its inner end wall.

5. A fruit-sorter comprising a casing, a pair of rollers arranged therein, the said rollers being convergent, and downwardly-inclined friction-disks on the rollers engaging one with the other, a shaft extended through the casing, a driving connection between said shaft and one of the rollers, a guide-board extended lengthwise between the rollers, and laterally-extended deflectors on the guide-board.

6. A fruit-sorter comprising a casing, a discharging-roller arranged therein, a guide-board extended lengthwise of the roller, and a deflector extended over the roller the distance between said deflector and the roller diminishing from the inlet end to the opposite end of the machine.

7. A fruit-sorter comprising a casing, discharging-rollers arranged therein, deflectors over the rollers, a feed-tray at one end of the casing and having openings in its inner end wall over the rollers, and a board mounted to swing transversely in said tray.

In testimony whereof I have signed my name to this specification in the presence of two subscribing witnesses.

JAMES B. CRUM.

Witnesses:
J. L. LANGHAM,
W. P. JOHNSON.